United States Patent [19]

Engebretson

[11] Patent Number: 5,059,672

[45] Date of Patent: Oct. 22, 1991

[54] ELASTOMERIC REACTION PRODUCTS OF AROMATIC ISOCYANATE, ALIPHATIC ISOCYANATE AND AROMATIC DIAMINE COMPONENTS

[75] Inventor: Preston J. Engebretson, Houston, Tex.

[73] Assignee: Thare Coat, Inc., Houston, Tex.

[21] Appl. No.: 543,452

[22] Filed: Jun. 25, 1990

[51] Int. Cl.$^5$ .................. C08G 18/12; C08G 18/32
[52] U.S. Cl. ........................... 528/64; 528/60; 528/68
[58] Field of Search ................ 528/64, 60, 68

[56] References Cited

U.S. PATENT DOCUMENTS

| | | | |
|---|---|---|---|
| 4,616,043 | 10/1986 | Smith | 528/60 |
| 4,686,242 | 8/1987 | Turner et al. | 528/64 |
| 4,902,768 | 2/1990 | Gerkin et al. | 528/73 |

Primary Examiner—John Kight, III
Assistant Examiner—John Cooney
Attorney, Agent, or Firm—Eric-Paul Mirabel

[57] ABSTRACT

Disclosed is an elastomer comprising the reaction product of an aromatic isocyanate component, an aliphatic isocyanate component with a functionality of at least two, and having an aromatic diamine component in the curing agent composition. The aromatic isocyanate component is one or more of the following: aromatic isocyanates, aromatic isocyanate terminated aliphatics, aromatic isocyanate terminated cycloaliphatics, aromatic isocyanate terminated quasi-prepolymers, and aromatic isocyanate terminated prepolymers. The aliphatic isocyanate component is one or more of the following: isocyanate terminated aliphatics, cycloaliphatic isocyanate with at least two isocyanates, isocyanate terminated quasi-prepolymers, and isocyanate terminated prepolymers. The curing agent includes one or more of the following:

(1) aromatic diiamines with which a gelation reaction results initially upon mixing the aromatic diamines with the aromatic isocyanate component and the aliphatic isocyanate component, and following the gelation reaction the elastomer cures, (2) reaction products of said aromatic diiamines with a subequivalent amount of a reactive prepolymer or quasi-prepolymer. Other ingredients may also be included. Some advantages of the elastomers of the invention are that they first form a quasi-gel composition before final curing, and this quasi-gel can hold to a sloping, vertical or overhead surface, and/or be worked or shaped. Further, the cured coatings form an essentially uniform and pinhole-free surface on curing. Other advantages stem from the good physical properties of the elastomers of the invention, including high tensile strength, high elongation, chemical and corrosion resistance, and hydrolytic stability.

30 Claims, 2 Drawing Sheets

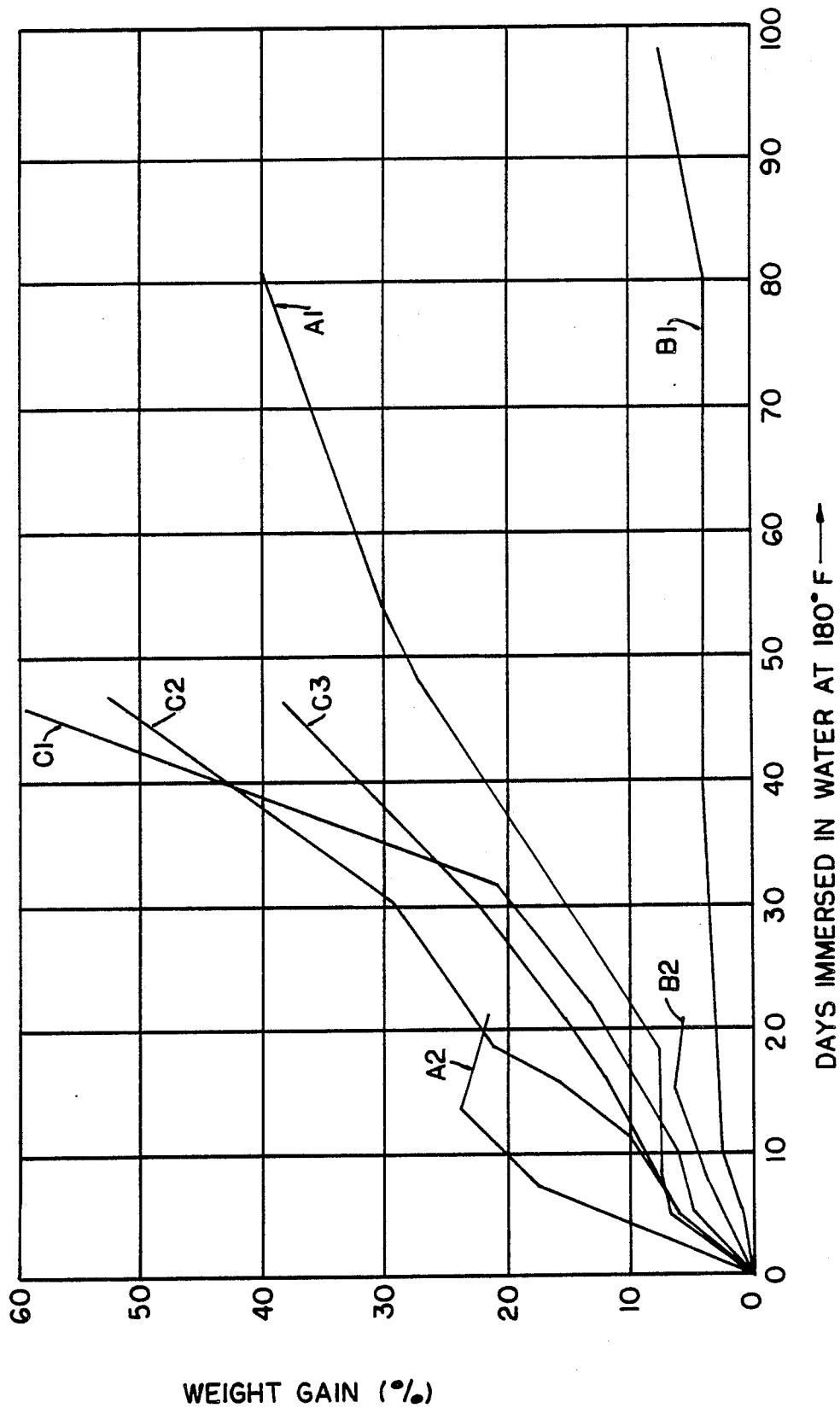

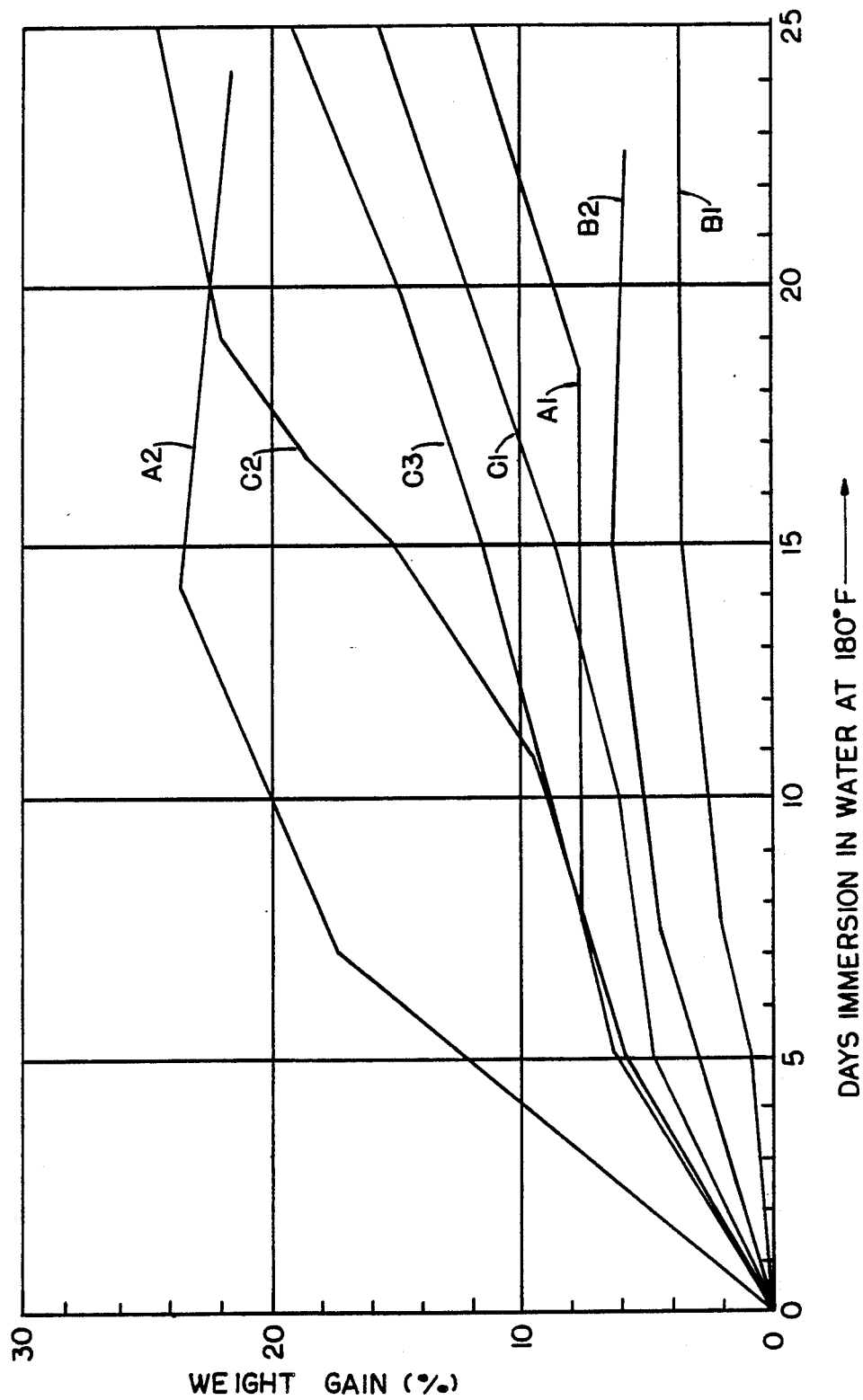

ELASTOMERIC REACTION PRODUCTS OF AROMATIC ISOCYANATE, ALIPHATIC ISOCYANATE AND AROMATIC DIAMINE COMPONENTS

FIELD OF THE INVENTION

The invention relates to elastomers made from the reaction product of an aromatic isocyanate component, an aliphatic isocyanate component with a functionality of at least two, and having an aromatic diamine component as the curing agent.

BACKGROUND OF THE INVENTION

It is known that polyurethane and poly(urea)urethane coatings can be applied to a variety of surfaces to provide an elastic seal. See, e.g., U.S. Pat. Nos. 4,267,299; 4,444,976; 4,463,126; 4,546,167. The advantage of these high solids, plural component solids over lower solids paints and coatings is that each coating can be applied more quickly and provide a greater coating thickness than lower solids paints and coatings. However, the known polyurethane and poly(urea)urethane coatings suffer from several disadvantages.

Polyurethane and poly(urea)urethane coatings are often applied to substrates, particularly concrete, by spraying, in an attempt to economically provide a smooth and/or chemical resistant surface. When applied to surfaces which are not substantially horizontal and upwardly facing, the sprayed material must cure quickly in order to avoid runs, sags, and uneven coating thickness on different areas of the surface. Slow-curing compositions may nevertheless be suitable for application to sloping, vertical, or overhead surfaces if fillers which increase viscosity are added. However, the viscous compositions are difficult to pump, meter and mix, and thus are not well-suited for spray application. Further, the fillers are often particulate, and particles passing through the pump apparatus can cause excessive wear and early failure of the pump's critical metering parts.

Although another way to avoid runs, sags, and uneven coating thickness on vertical, overhead, or sloping surfaces is to increase the coating's cure rate, a fast cure rate creates heat which expands air and gases which are in the coating or which are trapped under the coating. Air is often trapped under a coating which is applied to concrete, which almost always has multiple fissures and pores in which air remains after the coating is applied. Gases can become trapped because polyurethane and poly(urea)urethane coatings include isocyanate components and the reaction of such components with water produces carbon dioxide. The expansion of the air and other gases will cause bubbles, blisters, pinholes and other imperfections in the surface of the coating.

In order to avoid trapping air underneath the coating when applying it to concrete, the concrete surface can be made smooth prior to application of the coating. This can be done by applying cementatious or epoxy grouts, or through use of primers which seal the porous concrete surface. All these surface correction methods, however, increase the time needed to apply the coating—and therefore the cost—and also suffer from additional disadvantages. Without added catalysts to increase the cure rate, or without fillers, most known polyurethane and poly(urea)urethane coatings do not adhere well enough to become more than 0.01 to 0.02 inch thick on vertical or overhead surfaces, even if multiple coatings are applied. However, thicknesses of 0.03 to 0.10 inch are usually desired when the purpose is to provide a chemically resistant coating or a coating for pipes, storage tanks or concrete containers. The thicker coatings more effectively seal and prevent corrosion of the underlying substrate. Further, if the substrate is prone to cracking (viz., concrete), the thicker coatings will tend to bridge the cracks and maintain the seal.

In the absence of catalysts, the known polyurethane and poly(urea)urethane coatings cure slowly because of their chemical composition. They generally include, as essential components, a di- or poly-functional hydroxyl terminated entity (e.g., a higher molecular weight glycol), a di- or polyisocyanate, and a chain extender or curative (e.g., a polyol and/or polyamine with a relatively low molecular weight). See, e.g., U.S. Pat. No. 4,327,204 to Oyaizu et al. (disclosing a polyamine and a polyol as the hardener composition, mixed with an isocyanate composition); U.S. Pat. No. 4,526,905 to Lucast et. al. (Disclosing dialkyl diamines for use with polyols and polyisocyanates); U.S. Pat. No. 4,581,433 (Disclosing an isocyanate prepolymer and polyalkene ethers having hydroxyl functionalities of 2 to 3, and at least one diprimary aromatic diamine); U.S. Pat. Nos. 4,267,299; 4,444,976; 4,463,126; 4,546,167; See also U.S. Pat. No. 3,428,610 to Kiebert (Disclosing an intermediate containing free NCO groups and an aromatic diamine). The known coatings are generally applied by one of two methods: "the one-shot method" or "the prepolymer method". But irrespective of which application method is used, the reaction of the essential components must be catalyzed (or fillers must be added) to achieve a sufficiently fast reaction to be suitable for application to a surface which is not substantially horizontal and upwardly facing. The resulting fast, catalyzed reaction creates excessive heat, expansion of trapped air and other gases, and the associated problems noted above.

In both the one-shot and prepolymer methods of applying coatings, two streams of material are mixed. In the one-shot method the two streams both include relatively low viscosity materials, one stream containing the di- or polyisocyante and the other a mixture of polyols and/or curing agents. In the prepolymer method, one stream includes an isocyanate terminated prepolymer and the other includes the curing agent. When using the one-shot method, additional disadvantages may result from using catalysts because the catalysts will enhance the reaction of the isocyanates with water. Thus, even if the only water source is from a humid environment, the reaction will produce carbon dioxide. In addition, water induces formation of an amine which reacts preferentially to the polyol in the curing agent with the di- or polyisocyantes. This latter reaction alters the cure stoichiometry and may result in unreacted hydroxyl molecules, which may increase the permeability of the cured coating.

Another disadvantage of catalysts is that the resulting coating is not well-suited to application of successive additional coatings, as may often be desired. The successive coatings often tend to delaminate, because the fast rate of cure depleats the reactive sites of each successive layer upon itself. Finally, a high catalyst concentrations in the final coating can accelerate its destruction by hydrolysis if it comes into contact with water or ambient moisture.

Thus, what is needed is a high solids, plural component, sag resistant, low exothermic curing coating, which does not require added fillers. The coating surface should be substantially pinhole and imperfection free, and the coating should be sufficiently thick to bridge cracks in the substrate. The coating should also cure properly and evenly in the presence of water and be chemical and corrosion resistant.

SUMMARY OF THE INVENTION

The invention includes an elastomer comprising the reaction product of an aromatic isocyanate component, an aliphatic isocyanate component with a functionality of at least two, and having an aromatic diamine component in the curing agent composition. The aromatic isocyanate component includes one or more of the following: aromatic isocyanates, aromatic isocyanate terminated aliphatics, aromatic isocyanate terminated cycloaliphatics, aromatic isocyanate terminated quasi-prepolymers, and aromatic isocyanate terminated prepolymers. The aromatic isocyanate component preferably has an isocyanate content of from about 4 to 40 percent by weight.

The aliphatic isocyanate component with a functionality of at least two includes one or more of the following: isocyanate terminated aliphatics, cycloaliphatic isocyanate with at least two isocyanatess, isocyanate terminated quasi-prepolymers, and isocyanate terminated prepolymers. The aliphatic isocyanate component with a functionality of at least two is preferably derived from the reaction products of one or more of the foregoing aliphatic or cycloaliphatic isocyanates (or diisocyanates) with a subequivalent amount of a hydroxyl entity. The hydroxyl entity includes one or more of the following: poly-(alkene ether)glycols, polyester glycols, mixed synthetic rubber polyols, poly(ether-ester) glycols, polythioethers, polyether triols, polyepoxides having hydroxyl functionality, polyether quadrols, and polycaprolactone glycols.

The aromatic diamine component includes one or more of the following:

(1) aromatic diamines with which a gelation reaction results initially upon mixing them with the aromatic isocyanate component and the aliphatic isocyanate component with a functionality of at least two, and following the gelation reaction the elastomer cures;

(2) reaction products of such aromatic diamines with a subequivalent amount of a reactive prepolymer or quasi-prepolymer.

The reactive prepolymer preferably has free isocyanate groups and a molecular weight of about 140 to 2,000. If the free isocyanate groups result from a combination of a diisocyanate and a reactive prepolymer, the diisocyanate is preferably about 500 isocyanate percent of the prepolymer. The aromatic diamine component can further include a reaction product of a diprimary diamine with a di-epoxide and/or a polyepoxide having at least two 1,2 epoxide groups per molecule, and wherein the reaction product of the epoxide and the aromatic diamines has a molecular weight of from about 90 to about 750.

The aromatic isocyanate, aliphatic isocyante and aromatic diamine components are preferably present in amounts corresponding to an isocyanate:amine equivalent ratio in the range of from about 0.7 to 1.3:1. The curing agent composition may also include, to lengthen the time after mixing that a gell forms, up to about 95 equivalent percent of a variety of chain extenders.

These chain extenders may include a di- and/or polyhydric alcohol having primary or secondary hydroxyl groups.

The elastomers of the invention can further include other conventional additives, e.g., pigments, UV stabilizers, solid fillers, reinforcing fibers and the like, as well as solvents.

The elastomers of the invention all form, at a relatively low exotherm and prior to curing, a quasi-gel. The quasi-gel is believed to form because the aromatic diamines have groups in the ortho position to one of their free amine groups which sterically hinder that amine group more than the other. The less sterically hindered amine group is believed to react first with the free aromatic isocyanate groups to form the quasi-gel. As the other amine group reacts, the elastomer cures.

The quasi-gel is sufficiently viscous to remain suspended from sloping, vertical or overhead surfaces while the elastomers cure. The elastomers of the invention also cure at a relatively low exotherm. Thus, the problems associated with excessive heat on curing, especially surface imperfections such as pinholing, are avoided with the elastomers of the invention.

The various ingredients of the elastomers of the invention can be adjusted in a manner known to those skilled in the art to achieve coatings with different properties. Some desirable coating properties may be fast curing, sag and run resistance, hydrolytic stability, hydrolytic insensitivity during curing, chemical and corrosion resistance, high tensile strength and high elongation. Coatings which optimize most of these properties can be achieved with the elastomers of the invention. The invention, and its manner and process of making and using, will now be described in further detail with reference to the preferred embodiments.

BRIEF DESCRIPTION OF THE DRAWINGS

FIG. 1 shows the percentage weight gain against time, over a 25 day period, for several different elastomers.

FIG. 2 shows the percentage weight gain against time, over a 100 day period, for several different elastomers.

DETAILED DESCRIPTION OF THE PREFERRED EMBODIMENTS

The elastomers of the invention include those described above under the heading "Summary of the Invention." Certain further preferred embodiment, and considerations involved in making them, are described further below.

As noted above, when the aromatic diamine component is reacted with the aromatic isocyanate component and the aliphatic isocyanate component with a functionality of at least two, a quasi-gel forms before the final cure takes place. The quasi-gel formation and cure both take place at a relatively low exotherm, thereby avoiding excessive heat and the associated problems.

The adjustment of the equivalent percent of the various components controls the rate of gelation and curing. A greater equivalent percent of the aromatic isocyanate component in relation to the aliphatic isocyanate component with a functionality of at least two will increase the gelation and curing rates. This increase is believed to occur because the aromatic isocyanate will react preferentially to the aliphatic isocyanate component with the aromatic diamine component. However, varying the amount of the aliphatic isocyanate component will also change the ratio of aromatic isocyanate to aromatic diamine component, and will therefore also change the gelation and cure rates, but a decrease in the aliphatic isocyanate component will have the same effect as in increase in aromatic isocyanate. The acceptable range of aromatic isocyanate to aliphatic isocyanate component is preferably about 5 to about 130 equivalent percent.

In comparing the total isocyanate:amine equivalent ratio (which includes both the aliphatic isocyanate component and the aromatic isocyanate components as well as the aromatic diamine component), an excess of amine is generally preferred, so that some terminal amines are available for reaction with the isocyanates. The aromatic isocyanate and aliphatic isocyanate components and the aromatic diamine component can, however, be in amounts corresponding to an isocyanate:amine equivalent ratio in the range of from 1.0–1.1:1, for good high temperature stability and hydrolytic stability. For better insensitivity to moisture during curing, the preferred ratio is about 0.7–1.0:1. This is because if there is excess free isocyanate, it tends to react with water during curing, thereby generating carbon dioxide and producing a foam, which creates pinholes and other imperfections in the final coating. The cure and gelation rates are the fastest when the ratio is about 1:1.

It is also noted that usually the chain length of the aromatic isocyanate component or the aliphatic isocyanate component can be increased to reduce the equivalent isocyanate content. Although the same effect can also be achieved by lengthening the chain of the prepolymer or quasi-prepolymer which is reacted with the aromatic diamine to form the aromatic diamine component, most longer chain aromatic diamines are not approved for sale by the Environmental Protection Agency.

It is further noted that the aromatic diamine component is preferably not in subequivalent amount to the aromatic isocyanate component. When the ratio is as such, excess isocyanate groups will remain after the curing reaction, and such isocyanate groups will react with any water or other hydroxyl bearing entities which are present.

As noted above, the aromatic diamine component in the curing agent includes aromatic diiamines and the reaction products of the aromatic diiamines with a subequivalent amount of a reactive prepolymer or quasi-prepolymer. The lower molecular weight diamine-prepolymer conjugates (having shorter prepolymer or quasi-prepolymer chains) will generally provide a final elastomer product with greater tensile strength, because the long chain covalent aliphatic bonds in the prepolymer or quasi-prepolymer are weaker than the amine-isocyanate bonds. The preferred reactive prepolymer has free isocyanate groups, which react with the aromatic diamine(s), and a molecular weight of about 140 to 2,000 . However, this molecular weight can be adjusted as desired to increase the tensile strength of the final elastomeric product, or to provide a product which can be elongated more before breaking, as desired.

If the aromatic diamine component includes a combination of a diisocyanate and a reactive prepolymer, the diisocyanate is preferably about 500 isocyanate percent of the prepolymer. It is more preferred to have the aromatic diamine in the aromatic diamine component reacting with both short and long chain reactive isocyanate prepolymers, which together provide the above-noted 500 isocyanate percent. This creates an alternating short and long chain aromatic diamine component, which provides an elastomer with good tensile strength and elongation characteristics.

As noted above, the reactive prepolymer in the aromatic diamine component can further include a reaction product of a diprimary diamine with a di-epoxide and/or a polyepoxide having at least two 1,2 epoxide groups per molecule, and wherein the reaction product of the epoxide and the aromatic diamines has a molecular weight of from about 90 to about 750. The isocyanate groups react preferentially to the epoxide groups with the amine groups. This preferential reaction provides a urethane backbone for the final elastomer product, and makes a stronger and more rigid final elastomer, which also has increased resistance to chemical breakdown.

As noted above, the aromatic diamine component can also include up to about 95 equivalent percent of a di- or polyamine, or of a dihydric, polyhydric alcohol having primary or secondary hydroxyl groups. In other words, the aromatic diamine component only needs to include 5 equivalent percent of the aromatic diamine. When di- or polyamines, reaction products of the same with subequivalents of organic di- or polyisocyanates, reaction products with subequivalents of di-or polyepoxides, or combinations of the above are included in the aromatic diamine component, they will tend to decrease the sag resistance (i.e., increase the sag) of the quasi-gel. A preferred additional di- or polyamine component is one with a reactivity for the aromatic di- or polyisocyanate component lower than the aromatic diamine component. Secondary aromatic alkyl diamines of the structure:

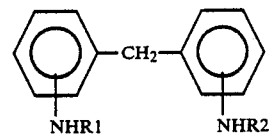

where R1 and R2 contain 4–20 carbon atoms provide acceptable pot lives and good physical properties when incorporated at up to 95 equivalent percent in the aromatic diamine component. It is more preferred if R1 and R2 contain from 4–10 carbon atoms, more preferred yet if R1 and R2 contain 4–8 carbon atoms. Other preferred additional ingredients in the aromatic diamine component are U4200 TM (UOP Corporation) and E300 TM (Ethyl Corp.), or polyol amines, or Jeffamine TM polyether polyamines (Texaco Chemical Co.), e.g., the low molecular weight products (D-230, D-400 and T-403), intermediate molecular weight products (D-2000) and higher molecular weight products (Jeffamine T-5000 TM ), as none of these will not decrease the sag resistance of the quasi-gel.

Dihydric or polyhydric alcohols in the aromatic diamine component slow the reaction and lengthen the time after mixing that a quasi-gel forms. However, dihydric or polyhydric alcohols also increase the moisture sensitivity of of the reaction, as water can react with the isocyanate groups.

As noted above, the aromatic diamines in the aromatic diamine component are preferably those with one free amine group which is more sterically hindered than the other. This allows the more reactive amine group to react preferentially with the aromatic isocyanate groups and initially form a quasi-gel, prior to final curing. Exemplary aromatic diamines include one or more of the following: 1,3-dimethyl-2,4-diaminobenzene, 1,3-diethyl-2,4-diaminobenzene, 1,3-dimethyl-2,6-diaminobenzene, 1,4-diethyl-2,6-diaminobenzene, 1,3,5-triethyl-2,6-diaminobenzene, 1,4-diethyl-2,5-diaminobenzene,1,4-diisopropyl-2,5-diaminobenzene,1,4-dibutyl-2,5-diaminobenzene,1,3,5-triethyl-2,4-diaminobenzene, 1,3,5-triisopropyl-2,4-diaminobenzene, 2,3-dimethyl-1,4-diaminonapthalene, 2,6-dimethyl-1,5-diaminonapthalene, 2,6diisopropyl-1,5-diaminonapthalene, 2,6-dibutyl-1,5-diaminonapthalene, 3,3',5,5'-tetramethylbenzidene, 3,3',5,5'-tetraisopropylbenzidene,3,3',5,5'-tetramethyl-4,4'diamino-diphenylmethane,3,3',5,5'-tetraethyl-4,4'-diamino-phenylmethane,3,3',5,5'-tetraisopropyl-4,4'-diamino-phenylmethane, 3,3',5,5'-tetrabutyl-4,4'-diamino-phenylmethane, 3,5-diethyl-3'-methyl-2',4-diaminophenylmethane, 3,3'-diethyl-2,2'-diaminophenylmethane, 3,3',5,5'-tetraethyl-4,4'-diaminobenzophenone, 3,3',5,5'-tetraisopropyl-4,4'-diaminobenzophenone, 3,3',5,5'-tetraethyl-4,4'-diamino-diphenyl ether, 3,3',5,5'-tetraisopropyl-4,4'-diamino-diphenyl ether, and 3,3',5,5'-tetraisopropyl-4,4'-diamino-diphenyl sulfone.

The more preferred aromatic diamines are 1-methyl-3,5-diethyl-2,4-diaminobenzene, 1-methyl-3,5-diethyl-2,6-diaminobenzene. Both are ingredients in the most preferred aromatic diamine, that is, DETDA TM (Ethyl Corporation).

With respect to the prepolymers or quasi-prepolymers in the aliphatic isocyanate component, it is noted that the relationship between the equivalent amount of aromatic isocyanate in relation to the prepolymer or quasi-prepolymer controls the gelation rate, the degree of sag resistance, and the exotherm of the reaction. The greater the amount of the aromatic isocyanate, the faster the gelation and cure reactions and the higher the exotherm. It is further noted that a lower molecular weight aliphatic isocyanate component will react with the diamine component faster and form a quasi-gel faster, and provide greater sag resistance, than a higher molecular weight (longer chain) aliphatic isocyanate component. Thus, for faster curing and gelation reactions and greater sag resistance, a lower molecular weight aliphatic isocyanate component is preferred. Nevertheless, the faster reaction will result in a higher exotherm, which may be undesirable. Some idea of the relationship between the molecular weight and the gelation rate can be gleaned from Table III below.

The aliphatic isocyanate component preferably has an isocyanate content of from about 1 to about 20 percent by weight, more preferably from about 2 to about 10 percent by weight, and most preferably from about 3 to about 7 percent by weight. As noted above, the preferred aliphatic isocyanate component are derived from the reaction products of one or more of the aliphatic or cycloaliphatic isocyanates or diisocyanates set forth above in the "Summary of the Invention" with a subequivalent amount of a hydroxyl entity. The hydroxyl entity is more preferably one or more of the following: polytetramethylene ether glycol of 650-2900 molecular weight, polypropylene ether glycol of 200-4000 molecular weight, polycaprolactone glycol of 500-3000 molecular weight, polyethylene adipate glycol of 500-3000 molecular weight, poly (ethyleneoxide)-terminated poly (propylene ether) glycol of 500-3000 molecular weight and hydroxyl terminated polybutadiene.

Where chemical corrosion resistance is desired in the final elastomer, the hydroxyl entity is preferably one or more of: hydroxyl terminated polythioethers (made by PRC Corp.); polyester glycols; hydroxyl terminated polybutadienes; poly-epoxides having hydroxyl functionality. Where hydrolytic stability is desired, the hydroxyl entity is preferably one or more of: hydroxyl terminated polyethers; hydroxyl terminated polybutadienes; hydroxyl terminated polythioethers.

Aliphatic or cycloaliphatic isocyanates or diisocyanates useful for reacting these hydroxyl entities include, preferably, 4,4'-diisocyanato-dicyclohexylmethane, hexamethylene diisocyanate, 1-isocyanato-3,3,5-trimethyl-5-isocyanatomethylcyclohexane (IPDI TM made by Huls America), and m-tetramethylxylene diisocyanate (M-TMXDI TM made by American Cyanamid). IPDI TM is more preferred as it provides an elastomer with good physical characteristics and it reacts fairly slowly with the aromatic diamine component, thereby reducing the exotherm and heat of reaction. M-TMXDI TM is not as preferred as it must cure at an elevated temperature.

The preferred aromatic isocyanate component includes, as noted above, a di- or poly-isocyanate, quasi-prepolymer, prepolymer or any mixture thereof, preferably based on diphenylmethane diisocyanate.

As noted above, the elastomers of the invention can further include other conventional additives, e.g., plasticizers, coal tar, pigments, UV stabilizers, solid fillers, reinforcing fibers and the like. The elastomers of the invention can also include solvents at up to about 15 percent by weight, based on the total weight of the composition. Exemplary solvents include methyl ethyl ketone, dimethyl formamide, methyl isobutyl ketone, toluene, xylene and the like. However, solvents are not preferred unless necessary to lower the viscosity so as to achieve a composition suitable for spray or other low-viscosity application.

EXAMPLES SHOWING THE GELATION RATE OF 24 DIFFERENT COMPOSITIONS

In order to illustrate the gelation properties of different combinations of the aromatic diamine component, the aliphatic isocyanate component, the aromatic isocyanate component, and several of the other ingredients mentioned above, 24 different combinations of such components and ingredients were tested, and their gelation rates were recorded. Table I below lists the generic class of each of the components and ingredients used in the 24 different combinations which are set forth as the 24 examples in Table III below, as well as the meanings of the abbreviations in Table III.

TABLE I

| | Aliphatic isocyanate component |
|---|---|
| IPDI: | Isophorone diisocyanate (1-isocyanato-3,3,5-trimethyl-5-isocyanatomethylcyclohexane) |
| M-TMXDI: | m-tetramethylxylene diisocyanate |
| | Aromatic Isocyanate Component |
| 744: | a reaction product of polypropylene glycol and diphenylmethane diisocyanate having an isocyanate content of about 23.4 percent by weight. |

TABLE I-continued

| | |
|---|---|
| 743: | a reaction product of polypropylene glycol and diphenylmethane diisocyanate having an isocyanate content of about 8.0 percent by weight. |
| 27: | a crude product of diphenylmethane diisocyanate having an isocyanate content of about 31.4 percent by weight. |
| 208: | a product of diphenylmethane diisocyanate having an isocyanate content of about 30.8 percent by weight. |
| Polyethers | |
| PTMEG 650: | Polytetramethylene glycol of M.W. 650 |
| PTMEG 1000: | Polytetramethylene glycol of M.W. 1000 |
| E-351: | Polypropylene glycol diol of M.W. 2800 |
| M-3900: | Polypropylene glycol diol of M.W. 4800 |
| Polythioethers | |
| 855: | a liquid polythioether polyol of M.W. 3200 |
| Polybutadienes | |
| R-45HT: | Hydroxy-terminated homopolymers of butadiene of M.W. 2800 |
| Miscellaneous Polyols | |
| 105-G Cure: | Acrylic polyol of M.W. 1500 |
| Aromatic Diamine Component | |
| DETDA: | A 75/25 mixture of 3,5-diethyltoluene-2,4-diamine and 3,5-diethyltoluene-2,6-diamine. |
| U-4200: | N,N'-di(2-butyl)-4,4'-methylene dianiline |
| E-300: | a combination of 3,5-dimethylthio-2,4-toluene diamine and 3,5-dimethylthio-2,6-toluene diamine |
| Other Materials | |
| T-12: | Dibutyl tin dilaurate |

Six prepolymers for use in the 24 different compositions to be tested were then prepared. The ingredients in these 6 prepolymers (A-F) are listed below in TABLE II.

To prepare the prepolymers, the polyether and/or polyol component(s) was introduced into a 1-3 liter glass reaction vessel equipped with an exterior heating jacket and a mechanical stirrer, which was under vacuum. The temperature was elevated to about 90° C. with stirring under vacuum for about 3 hours to remove any residual moisture from the polyether/polyol. After cooling the polyether/polyol to below about 30° C., the aliphatic isocyanate component was added along with any catalyst or other coating ingredients by dropping funnel. The mixture was reacted at temperatures ranging from about 90°-100° C. for about 4-5 hours. As the resultant prepolymers were cooled, the desired amount of aromatic isocyanate entity, if any, was added with stirring under vacuum by a dropping funnel. The final mixture was aged for one week at about 25° C. under a nitrogen atmosphere prior to use.

The 24 different compositions were prepared by mixing at room temperature, (a) the polyisocyanate component specified in Table III with or without an aromatic isocyanate component and (b) the other diamine, polyol entities and additives in the amounts specified in Table III. These compositions were monitored to determine the time to initial gelation in a 50 to 100 gram mass, also as indicated in Table III.

TABLE II

| Prepolymer Type | IPDI (gm) | TMXDI (gm) | PTMEG 650 (gm) | PTMEG 1000 (gm) | E-351 (gm) | M-3000 (gm) | R-45HT (gm) | 105 G-Cure (gm) | 855 (gm) | T-12 (Drops) | NCO % by wt. |
|---|---|---|---|---|---|---|---|---|---|---|---|
| A | 115 | | | 50 | | 472 | | | | 4 | 4.23 |
| B | 111 | | | 50 | 224 | 236 | | | | 4 | 4.00 |
| C | 111 | | | 50 | 245 | | 180.45 | | | 4 | 4.11 |
| D | 111 | | | | 224 | 236 | | 75 | | 8 | 3.85 |
| E | | 122.1 | | 50 | 427 | | | | | 4 | 4.17 |
| F | | 122.1 | 40.62 | | | | | | 448.56 | 4 | 4.08 |

TABLE III

| EXPL NO. | PREPOLYMER Type | AMOUNT (gm) | AROMATIC ISOCYANATE COMPONENT | | | | POLYETHER |
|---|---|---|---|---|---|---|---|
| | | | 744 (gm) | 743 (gm) | 208 (gm) | 27 (gm) | M-3900 (gm) |
| 1 | A | 100 | | | | | |
| 2 | A | 100 | | | | 13.2 | 29.44 |
| 3 | A | 100 | 5 | | | | 20.54 |
| 4 | A | 100 | 7.5 | | | | 22.77 |
| 5 | A | 100 | 10 | | | | 25.01 |
| 6 | B | 100 | 10 | | | | |
| 7 | B | 100 | 10 | | | | |
| 8 | B | 100 | | | 8 | | |
| 9 | B | 100 | | | 16 | | |
| 10 | B | 100 | • | | 20 | | |
| 11 | B | 100 | 10 | | | | |
| 12 | C | 100 | 10 | | | | |
| 13 | D | 100 | 10 | | | | |
| 14 | D | 100 | 10 | | | | |
| 15 | D | 100 | 10 | | | | |
| 16 | E | 100 | 8 | | | | |

TABLE III-continued

| EXPL NO. | | | | | POLYBUTADIENE R-45HT (gm) | AROMATIC DIAMINE COMPONENT | | | TIME TO QUASI-GEL (MIN:SEC) | AMBIENT TEMP. (°F.) |
|---|---|---|---|---|---|---|---|---|---|---|
| | | | | | | DETDA (gm) | U-4200 (gm) | E-300 (gm) | | |
| 17 | E | 100 | 6 | | | | | | | |
| 18 | E | 100 | 4 | | | | | | | |
| 19 | E | 100 | 2 | | | | | | | |
| 20 | E | 100 | 1 | | | | | | | |
| 21 | E | 100 | | | | | | | | |
| 22 | E | 100 | | 11.64 | | | | | | |
| 23 | F | 100 | 4 | | | | | | | |
| 24 | F | 100 | | 3 | | | | | | |
| 1 | | | | | | 8.33 | | | NT | 80 |
| 2 | | | | | | 14.72 | | | :26 | 80 |
| 3 | | | | | | 10.27 | | | 2: | 80 |
| 4 | | | | | | 11.38 | | | 1: | 80 |
| 5 | | | | | | 12.5 | | | :42 | 80 |
| 6 | | | | | | 1.68 | | 14.4 | 16: | 64 |
| 7 | | | | | | .84 | | 15.16 | NT | 64 |
| 8 | | | | | | 1.65 | 20.12 | | NT | 69 |
| 9 | | | | | | 2.26 | 27.56 | | 5: | 64 |
| 10 | | | | | | 2.56 | 31.22 | | 4: | 64 |
| 11 | | | | | | 12.60 | | | :45 | 66 |
| 12 | | | | | | 3.25 | | 11.74 | 9: | 66 |
| 13 | | | | | | 12.44 | | | :45 | 61 |
| 14 | | | | | 6.44 | 1.96 | | 11. | 5: | 74 |
| 15 | | | | | | 1.96 | | 13.4 | 6: | 74 |
| 16 | | | | | | 12.2 | | | :20 | 93 |
| 17 | | | | | | 11.28 | | | :30 | 93 |
| 18 | | | | | | 10.34 | | | :50 | 93 |
| 19 | | | | | | 9.38 | | | 1:20 | 93 |
| 20 | | | | | | 8.44 | | | 3: | 93 |
| 21 | | | | | | 10.32 | | | NT | 93 |
| 22 | | | | | | 10.1 | | | :55 | 93 |
| 23 | | | | | | 10.32 | | | :45 | 93 |
| 24 | | | | | | | | | :40 | 93 |

*NT = NOT THIXOTROPIC, INDICATING THAT NO QUASI-GEL WAS FORMED

Example 1 illustrates that the IPDI-ether prepolymer A, with a free isocyanate content of about 4.23 percent by weight, cured with DETDA ™ at an isocyanate:amine ratio of 1:0.95, never achieves gelation.

Example 2 demonstrates the addition of an aromatic isocyanate entity and a polyether to the composition of Example I, resulted in a very rapid gelation reaction, (26 seconds to form a quasi-gel).

Example 3, although using the same prepolymer A as in examples 1 and 2, has a 2 minute time to quasi-gel and a workable pot life of 15 minutes.

In example 6 an aliphatic prepolymer having almost equal amounts of di- and tri-functional polyols is used. It shows one of the longer times to the formation of the quasi-gel (16 minutes after initial mixing). Although this lengthy gelation time may be partially the result of the relatively low ambient temperature, it is more likely due to the composition being near the lower limit of the equivalent amount of the aromatic diamine component required for forming a quasi-gel.

Examples 7 and 8 illustrate that the aromatic isocyanate 208 is not present in sufficient quantity to create an amine:isocyanate ratio which will form a quasi-gel.

In examples 16 to 24, where the aliphatic isocyanate component is based on the metaisomer of tetramethylxylene diisocyanate with a free isocyanate content of about 4.08-4.17 percent by weight (depending on the particular example chosen) it is seen that a much lesser equivalent percent of the aromatic isocyanate component is required to form the quasi-gel. Yet, as is demonstrated in Example 21 where there is a total lack of such an aromatic isocyanate component and no quasi-gel forms, at least some of the aromatic isocyanate component is required.

HYDROLYTIC STABILITY AND OTHER USEFUL PROPERTIES

It seems that the addition of the aromatic isocyanate component to the composition improves the hydrolytic stability of the elastomers of the invention. Tests were performed to compare the hydrolytic stability of the polyurethane and poly(urea)urethane coatings of the prior art and the elastomers of the present invention. Samples of such coatings were prepared by the hand cast method and/or by plural component spraying onto high molecular weight polyethylene sheets, so that free films were created upon the removal of the coatings applied to the polyethylene sheets. Typical film samples were about 0.080-0.100 inch thick and generally were about one inch wide by three inches long. To ensure that the sample thickness did not influence the hydrolysis of the coatings, numerous other samples of thicknesses ranging from about 0.025-0.250 inch were also tested. Within 5 to 7 days of testing, the percent weight gains of all the samples, irrespective of thickness, were close to the weight gains (within experimental deviation) of the 0.080-0.100 inch thick samples.

To perform the tests, samples were placed in closed one quart glass jars filled with distilled water to about one inch from the top. All samples were weighed and identified prior to immersion. The jars were then placed in a double walled convection oven at a temperature from about 180°-190° F. All samples were removed from the water weekly, blotted dry with a paper towel, and weighed within 30 minutes of removal to calculate the percent weight gain over original weight.

FIGS. 1 and 2 illustrate the poor hydrolytic stability (i.e. high weight gain) of three commercially manufactured polyurethane elastomers which are based on aromatic isocyanates (C1, C2, C3,) and two aliphatic based elastomers which do not include an aromatic isocyanate component (A1, A2). B1 and B2 have the same components as the two aliphatic based elastomers (A1, A2) but also include an aromatic isocyanate component in accordance with the present invention. It can be seen that B1 and B2 did not gain as much weight as the other elastomers.

The elastomer C1 represents a castor oil, MOCA ™ (Anderson Corp.), MDA ™ (Allied Signal) system reacted within a crude MDI (Mobay) having a functionality of 2.7. The elastomer C2 represents a polypropylene glycol diol reacted with a crude MDI having a functionality of 2.4. The elastomer C3 represents an ether diphenylmethane diisocyanate prepolymer having an isocyanate content of about 19% cured with castor oil and diamine.

FIG. 1 shows that weight gains for the conventional (C1–C3) coatings exceeded 35% in 45 days. Failure of such aromatic isocyanate systems typically occurs at a weight gain of greater than 45 percent. At such point, reversion to a quasi-solid liquid occurs, extreme blistering is evident, and all physical properties (including tensile strength) fall below 90 to 95 percent of original. All of the conventional (C1–C3) polyurethane elastomers which were tested reverted to such a useless quasi-solid liquid in 45 to 60 days.

The elastomer A1 represents a mixture of ether diols with a molecular weight of about 2800 and ether triols with a molecular weight of about 4800 prepared with isophorone diisocyanate having a resultant isocyanate content of about 4%, and cured with a diethylene toluene diamine (DETDA ™) at an isocyanate:amine equivalent of 1.0:0.95. The elastomer A2 represents an ether diol isophorone diisocyanate prepolymer manufactured by Mobay Corp. (designated E-41) with an isocyanate content of about 4% and cured with DETDA under the same conditions as A1. As is shown in FIG. 1, both of the aliphatic prepolymers cured with DETDA showed weight gains of from 20 to 30 percent in 45 to 60 days.

The elastomer B1 represents the aliphatic prepolymer of A1 with the addition of about 9 percent by weight of a quasi-prepolymer based on an ether polyol and 4,4'methylenebis (phenyl isocyanate) having about 23.4 percent isocyanate content, and cured with DETDA under the same conditions as A1. The elastomer B2 represents the aliphatic prepolymer of A2 also with the addition of about 9 percent by weight of a quasi-prepolymer based on an ether polyol and 4,4'-methylenebis (phenyl isocyanate) having about 23.4 percent isocyanate content, and cured with DETDA under the same conditions as A1. FIG. 1. illustrates that B1 has a weight gain of only approximately 7.5% after immersion for 100 days. In fact, this weight gain did not increase when measured over a period of 225 days. Further, when the physical properties of tensile strength, elongation, tear and hardness for a sample of B1 were measured after 150 days immersion, they were within 80% of those measured prior to immersion. Prior to making these measurements, the sample was removed and first allowed to air dry for one week. Thus, the elastomers of the invention are significantly more hydrolytically stable than conventional elastomers.

Another useful feature of the elastomers of the invention results from the formation of the quasi-gel. By adjusting the components as noted above, particularly the ratio of the aromatic diamine component to the aromatic isocyanate component, the time between gelation and final curing can be lengthened or shortened. This period can be varied from about 2 minutes to greater than 45 minutes. During this period, the quasigel consistency changes from that of a light and fluffy grease to that of a heavy paste.

Working or shaping the coating as it cures, e.g., forming a pattern in it, does not harm the resultant cured coating in a way that would render it unfit for most intended uses. As long as air is not entrained into the coating by such action, and provided that the working of the coating ceases prior to the stage where the coating becomes ropelike or stringy due to increasing lineation and cross-linking of the polymer, the physical and chemical properties of a cured coating which has been worked are within 10–20 percent of those obtained by simply casting the coating.

EXAMPLES OF USING THE ELASTOMERS OF THE INVENTION

Those skilled in the art are familiar with the conventional methods for preparing and applying poly(urea-)urethane coatings, and any such technique can be used in applying the elastomers of the invention. These coatings may be applied by brushing, a trowel, casting, injection molding, centrifuging, extruding, or preferably by spraying. Depending on the time to quasi-gel formation, which can be adjusted as noted above, and the rheology of the composition and the individual components, some of these application methods may be more suitable than others. For example, in order to extrude, trowel, injection mold or brush the elastomers on a surface, they must be viscous enough to be compatible with such a mode of application.

Spraying, which is the preferred method for application to most surfaces, is preferably done with a plural component metering pump well known to those skilled in the art. Such a pump can, for example, be: a double acting positive displacement piston pump which dispenses substantially equal volumes of material in both of the piston directions of travel (e.g., a Graco Hydro-Cat); a single acting piston or diaphragm pump in which the material being pumped is being dispensed only on the exhaust or discharge stroke of the piston or diaphragm (e.g., a pump conventionally used to mix and accurately meter fluid streams in chemical, pharmaceutical and cosmetic processes); a rotary gear, disc or wiper pumps (e.g., a pump conventionally used in the casting industry); or any pump or metering device which allows the components to be sprayed onto a surface with an accuracy in the metering of about $\pm 10\%$, and more preferably about $\pm 1-5\%$. These metering pumps separately convey the isocyanate components and the aromatic diamine component to a mix manifold, then through the spray device and out the spray tip. An example of a suitable conventional spray device is a Binks 43-P plural component gun.

Depending on the rheology of both of the isocyanate components and the aromatic diamine component, a positive pressure on the component(s) (applied, e.g., with a feed pump) may be required to introduce them into the metering pump. Alternatively, or in addition, the components may be heated to lower their viscosity. It is often desirable to heat the reservoir which houses the isocyanate component(s) and/or the aromatic diamine component, in order to lower the viscosity and enhance atomization of the sprayed coating.

When applying the elastomers of the invention with a plural component metering pump, if the quasi-gel forms too early, spraying can be impeded. When using a combination spray gun which has impingement mixing, the time to quasi-gel formation can be considerably shorter than when using a static mixer, which acts as a manifold for combining the isocyanate components and the aromatic diamine component.

When applying the elastomers of the invention with a spray gun, in order to have sufficient time to quasi-gel to not impede spraying, the aromatic isocyanate component is preferably diphenylmethane diisocyanate, in the range of about 5 to about 50 equivalent percent, and more preferably about 30 to about 49 equivalent percent, and most preferably about 35 to about 45 equivalent percent, where 100 percent equivalent is the total combined equivalents of the aromatic isocyanate component and the aliphatic isocyanate component.

In conclusion, the elastomers of the invention have a variety of useful properties. They provide an essentially smooth and pinhole-free surface, are chemically and hydrolytically stable, and can be shaped or worked during curing. It should be understood that the embodiments and examples discussed above are exemplary only and not limiting, and that the scope of protection is defined only in the claims which follow, and includes all equivalents of the subject matter of the claims.

What is claimed is:

1. An elastomer comprising the reaction product of an aromatic isocyanate component, an aliphatic isocyanate component with a functionality of at least two, and an aromatic diamine component, and wherein:
   the aromatic isocyanate component is selected from the group consisting of one or more of aromatic isocyanates, aromatic isocyanate terminated aliphatics, aromatic isocyanate terminated cycloaliphatic, aromatic isocyanate terminated quasi-prepolymers, and aromatic isocyanate terminated prepolymers;
   the aliphatic isocyanate component with a functionality of at least two is selected from the group consisting of one or more of isocyanate terminated aliphatics, cycloaliphatic isocyanate with at least two isocyanates, isocyanate terminated quasi-prepolymers, and isocyanate terminated prepolymers;
   the aromatic diamine component is selected from the group consisting of one or more of:
   (1) aromatic diiamines with which a gelation reaction results initially upon mixing the aromatic diamines with the aromatic isocyanate component and the aliphatic isocyanate component, and following the gelation reaction the elastomer cures,
   (2) reaction products of said aromatic diiamines with a subequivalent amount of a reactive prepolymer or quasi-prepolymer.

2. The elastomer of claim 1 wherein the reactive prepolymer or quasi-prepolymer is selected from the group consisting of one or more of (i) a reactive isocyanate terminated prepolymer containing free isocyanate groups with a molecular weight between about 140 and about 2000, (ii) a mixture of said reactive isocyanate terminated prepolymer with up to about 500 isocyanate equivalent percent of a diisocyanate, (iii) an epoxide selected from the group consisting of one or more di-epoxides and polyepoxides having at least two 1,2 epoxide groups per molecule and wherein the reaction product of said epoxide and said aromatic diamines has a molecular weight of from about 90 to about 750.

3. The elastomer of claim 1 wherein the aromatic diamines are selected from the group consisting of one or more of 1,3-dimethyl-2,4-diaminobenzene, 1,3-diethyl-2,4-diaminobenzene, 1,3-dimethyl-2,6-diaminobenzene, 1,4-diethyl-2,6-diaminobenzene, 1,3,5-triethyl-2,6-diaminobenzene, 1,4-diethyl-2,5-diaminobenzene, 1,4-diisopropyl-2,5-diaminobenzene, 1,4-dibutyl-2,5-diaminobenzene, 1,3,5-triethyl-2,4-diaminobenzene, 1,3,5-triisopropyl-2,4-diaminobenzene, 1-methyl-3,5-diethyl-2,4-diaminobenzene, 1-methyl-3,5-diethyl-2,6-diaminobenzene, 2,3-dimethyl-1,4-diaminonapthalene, 2,6-dimethyl-1,5-diaminonapthalene, 2,6-diisopropyl-1,5-diaminonapthalene, 2,6-dibutyl-1,5-diaminonapthalene, 3,3',5,5'-tetramethylbenzidene, 3,3',5,5'-tetraisopropylbenzidene, 3,3',5,5'-tetramethyl-4,4'diaminodiphenylmethane, 3,3',5,5'-tetraethyl-4,4'-diaminophenylmethane, 3,3',5,5'-tetraisopropyl-4,4'-diaminophenylmethane, 3,3',5,5'-tetrabutyl-4,4'-diaminophenylmethane, 3,5-diethyl-3'-methyl-2',4-diaminophenylmethane, 3,3'-diethyl-2,2'-diaminophenylmethane, 3,3',5,5'-tetraethyl-4,4'-diaminobenzophenone, 3,3',5,5'-tetraisopropyl-4,4'-diaminobenzophenone, 3,3',5,5'-tetraethyl-4,4'-diamino-diphenyl ether, 3,3',5,5'-tetraisopropyl-4,4'-diamino-diphenyl ether, 3,3',5,5'-tetraisopropyl-4,4'-diaminodiphenyl sulfone, and DETDA ™.

4. The elastomer of claim 1 wherein the aromatic diamine component further includes up to about 95 equivalent percent of a chain extender which is selected from the group consisiting of one or more of (i) dihydric alcohols having primary or secondary hydroxyl groups, (ii) polyhydric alcohols having primary or secondary hydroxyl groups.

5. The elastomer of claim 1 wherein the aromatic diamine component further includes up to about 95 equivalent percent of a chain extender which is selected from the group consisiting of one or more of (i) diamines, (ii) polyamines, (iii) reaction products of diamines with subequivalents of diisocyanates or polyisocyanates, or both, (iv) reaction products of polyamines with subequivalents of diisocyanates or polyisocyanates, or both, (v) reaction products of diamines with subequivalents of di-epoxides or polyepoxides, or both, (vi) reaction products of polyamines with subequivalents of di-epoxides or polyepoxides, or both.

6. The elastomer of claim 5 wherein reaction products (vi) have a molecular weight of from about 90 to about 750.

7. The elastomer of claim 6 wherein the amine groups in the chain extender have a lower reactivity with free isocyanate groups than that of the amine groups in the aromatic diamine component.

8. The elastomer of claim 6 wherein the diamines are secondary aromatic alkyl diiamines of the structure:

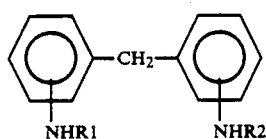

where R1 and R2 are alkyl groups which include from 4–20 carbon atoms.

9. The elastomer of claim 8 wherein R1 and R2 include from 4–10 carbon atoms.

10. The elastomer of claim 8 wherein R1 and R2 include from 4–8 carbon atoms.

11. The elastomer of claim 8 wherein R1 and R2 are both secondary alkyl groups.

12. The elastomer of claim 8 wherein R1 and R2 are both secondary butyl groups.

13. The elastomer of claim 7 wherein the diamines are N,N'-di(2-butyl)-4,4'-methylene dianiline.

14. The elastomer of claim 1 wherein the aliphatic isocyanate terminated prepolymers have an isocyanate content of from about 1 to 20 percent by weight.

15. The elastomer of claim 14 wherein the aliphatic isocyanate terminated prepolymers have an isocyanate content of from about 2 to 10 percent by weight.

16. The elastomer of claim 15 wherein the aliphatic isocyanate terminated prepolymers have an isocyanate content of from about 3 to 7 percent by weight.

17. The elastomer of claim 1 wherein the aliphatic isocyanate component is derived from the reaction products of one or more of isocyanate terminated aliphatics, cycloaliphatic isocyanate, isocyanate terminated quasi-prepolymers, and isocyanate terminated prepolymers with a hydroxyl entity selected from the group consisting of one or more of poly-(alkene ether)-glycols, polyester glycols, mixed synthetic rubber polyols, poly(etherester) glycols, polythioethers, polyether triols, poly-epoxides having hydroxyl functionality, polyether quadrols, and polycaprolactone glycols.

18. The elastomer of claim 17 wherein the aliphatic or cycloaliphatic isocyanates or diisocyanates are selected from the group consisting of IPDI TM and M-TMXDI TM, and the hydroxyl entity is selected from the group consisting of polytetramethylene ether glycol of 650–2900 molecular weight, polypropylene ether glycol of 400–4000 molecular weight, polycaprolactone glycol of 500–3000 molecular weight, polyethylene adipate glycol of 500–3000 molecular weight, poly (ethyleneoxide)-terminated poly (propylene ether) glycol of 500–3000 molecular weight and hydroxyl terminated polybutadiene.

19. The elastomer of claim 17 wherein the hydroxyl entity is selected from the group consisting of PTMEG 650 TM, PTMEG 1000 TM, M-3900 TM, 855 TM, 105-G Cure TM.

20. The elastomer of claim 17 wherein aliphatic isocyanate component is 1-isocyanato3,3,5-trimethyl-5-isocyanatomethylcyclohexane or m-tetramethylxylene diisocyanate.

21. The elastomer of claim 1 wherein the aromatic isocyanate component has an isocyanate content of from about 4 to 40 percent by weight.

22. The elastomer of claim 1 wherein the aromatic isocyanate component is MDI.

23. The elastomer of claim 1 wherein the aromatic isocyanate component is diphenylmethane diisocyanate.

24. The elastomer of claim 23 wherein the diphenylmethane diisocyanate is in the range of about 35 to 45 equivalent percent, where 100 percent equivalent is the total combined equivalents of the aromatic isocyanate component and the aliphatic isocyanate component.

25. The elastomer of claim 1 wherein the amounts of the aromatic isocyanate component, the aliphatic isocyanate component, and the aromatic diamine component are adjusted such that the isocyanate:amine equivalent ratio is from about 0.7–1.3:1.

26. The elastomer of claim 25 wherein the isocyanate:amine equivalent ratio is from about 1.0–1.1:1.

27. The elastomer of claim 25 wherein the isocyanate:amine equivalent ratio is from about 0.7–1.0:1.

28. The elastomer of claim 1 further including at least one filler which increases the elastomer viscosity.

29. The elastomer of claim 1 further including a solvent.

30. An elastomer of claim 1 further including in the aromatic diamine component U4200 TM, E300 TM, polyol amines, or Jeffamine TM polyether polyamines.

* * * * *